Aug. 14, 1962
W. M. HUTCHINSON
3,048,968
ROCKET MOTOR
Filed Jan. 2, 1958
3 Sheets-Sheet 1
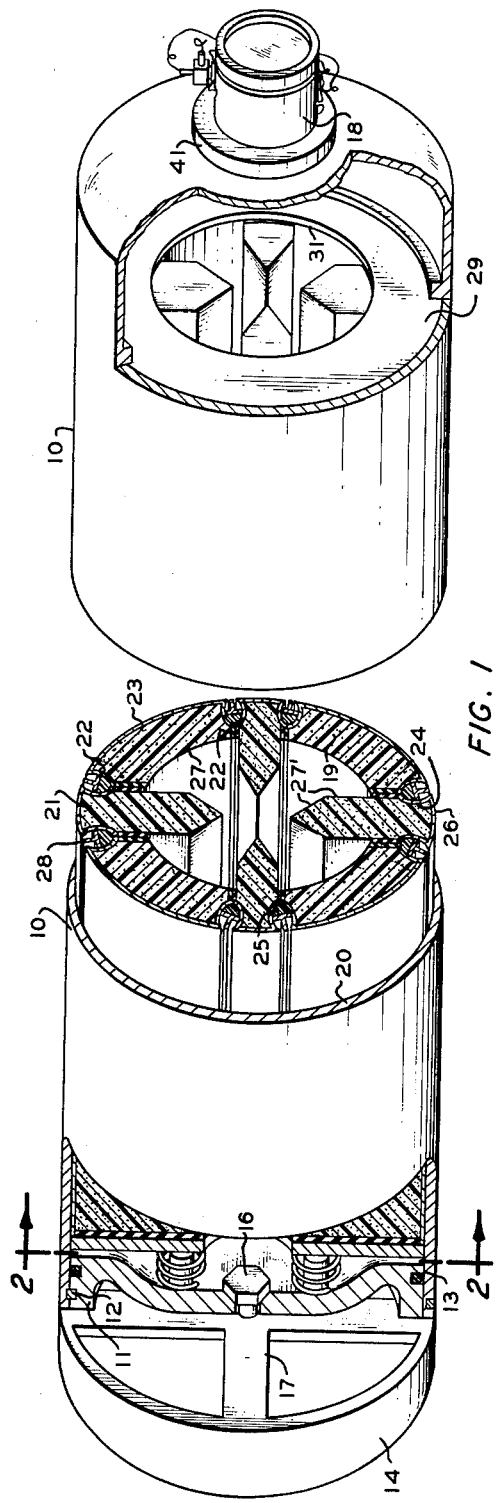
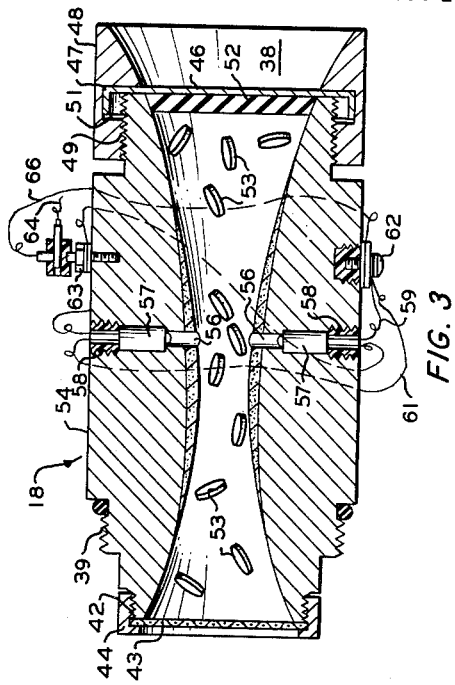
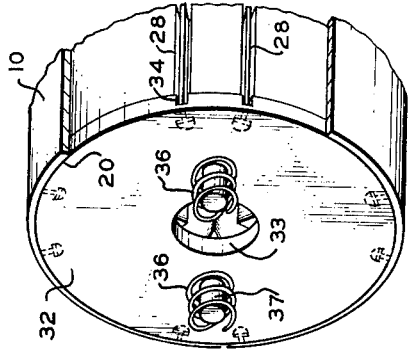
INVENTOR.
W. M. HUTCHINSON
BY *Hudson and Young*
ATTORNEYS

INVENTOR.
W. M. HUTCHINSON
BY
ATTORNEYS

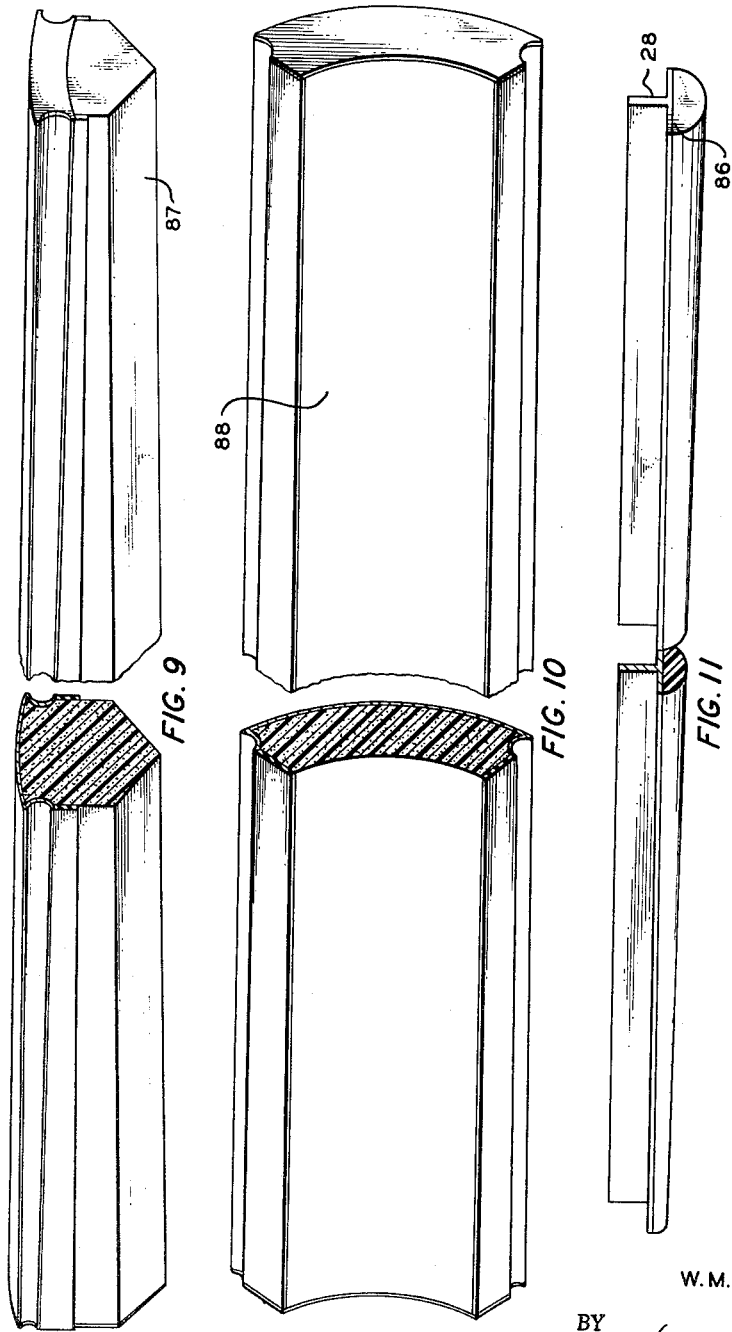

United States Patent Office 3,048,968
Patented Aug. 14, 1962

3,048,968
ROCKET MOTOR
William M. Hutchinson, Bartlesville, Okla., assignor to Phillips Petroleum Company, a corporation of Delaware
Filed Jan. 2, 1958, Ser. No. 706,860
11 Claims. (Cl. 60—35.6)

This invention relates to a rocket motor. In one aspect this invention relates to means for mounting grains of solid propellant in a rocket motor.

Rocket motors utilizing solid propellant may be classified in several categories depending on their size, shape and/or configuration of the charge, and on their utility (i.e., jet-assist-take-off, booster, sustainer or missile). Each classification has specific problems relating to its requirements and specifications. The present invention generally relates to those rocket motors utilizing large propellant charges having relatively long burning durations and capable of imparting high total impulse.

Rocket motors of the sustained-thrust type call for large propellant charges which involve scale-up problems of fabrication and assembly. Since such large propellant charges may weigh as much as 6,000 pounds or more, difficulties in fabricating and handling such large masses of propellant material are encountered. It is generally not feasible to extrude, mold, or cast a large cylindrical grain of propellant material having such great weight. Furthermore, is is difficult to properly support such large propellant charges in the combustion chamber of a rocket motor. Difficulties are encountered when one attempts to employ the usual methods of suspending a propellant charge in a rocket motor. Still another disadvantage is that the finished rocket cannot be inspected for fragmentation of, or formation of cracks in, the propellant charge and such a large heavy mass of propellant material is particularly susceptible of cracking or fragmentation caused by increased stresses and strains. Cracking or fragmentation of the propellant material causes a considerable increase in an exposed burning surface area with consequent development of excessive pressures which result in inefficient operation of the rocket motor and in many instances presents explosion hazards.

I have now discovered that the above difficulties can be avoided or mitigated by fabricating the propellant charge from a plurality of relatively small grains or blocks of propellant which are easier to fabricate in themselves, which can be handled more conveniently, and which can be bonded together to form a propellant charge having the desired configuration. Said small grains or blocks of propellant can be fabricated, stock-piled, and inspected immediately before assembly of the propellant charge in the rocket motor. For example, one can have a stock pile of propellant grains having the desired configuration and pass said grains down an assembly line where they pass through suitable inspection equipment, such as an X-ray machine, for detection of cracks or fissures. Faulty grains are discarded and satisfactory grains proceed to assembly.

Thus, broadly speaking, the present invention comprises a rocket motor wherein the propellant charge comprises a plurality of propellant grains or blocks having one side thereof covered with a rigid sheath of essentially non-combustible material adapted to coact with engaging means attached to the inner wall of the rocket motor so as to hold said propellant grains adjacent said inner wall of said rocket motor. As used herein and in the claims, unless otherwise specified, the term "essentially non-combustible material" means a material which does not burn under the conditions of use, or which burns or chars at such a slow rate, compared to the burning rate of the propellant that it will serve its intended purpose during the burning of the propellant grains.

An object of this invention is to provide an improved rocket motor. Another object of this invention is to provide means for fabricating a large propellant charge made up from small propellant grains or blocks. Still another object of this invention is to provide an improved propellant grain which can be stock piled, inspected, and then readily assembled into a large propellant charge in a rocket motor imediately prior to firing said rocket motor. Yet another object of this invention is to provide a rocket motor having a high degree of dependability. Other aspects, objects, and advantages of the invention will be apparent to those skilled in the art in view of this disclosure.

Thus, according to the invention there is provided a rocket motor comprising: a case defining a combustion chamber, said case being closed at its forward end; a nozzle defining a Venturi-like passage disposed in the after end of said case; a plurality of propellant grains disposed around the inner wall of said case with one side thereof adjacent said inner wall; said grains adjoining each other along a portion of at least one other side of each and the exposed non-adjoining surfaces of said grains defining a coaxially disposed passage through said combustion chamber; a rigid sheath of non-combustible material covering said side of each said grain which is adjacent said inner wall; and a plurality of engaging means, attached at spaced intervals to said inner wall of said case, adapted to coact with the sheathed portion of said grains so as to hold said grains adjacent said inner wall.

FIGURE 1 is a view, partly in cross section, partly in elevation, and partly cut away, of a rocket motor assembled in accordance with the invention.

FIGURE 2 is a view taken along the line 2—2 of FIGURE 1.

FIGURE 3 is a view in cross-section of one type of igniter which can be employed in the rocket motor of FIGURE 1.

FIGURES 9 and 10 illustrate propellant grains having a tapered configuration and which can be used in accordance with the invention.

FIGURE 11 illustrates one form of engaging means which can be employed in accordance with the invention.

Figure 5:
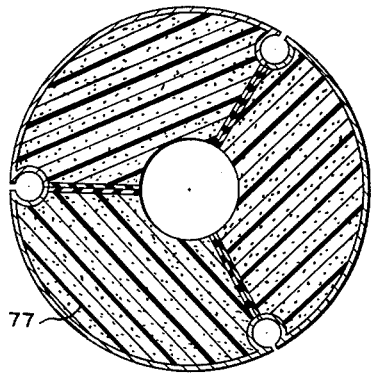
FIGURES 5 and 6 are cross-sections of other propellant charges assembled in accordance with the invention.

Referring now to the drawings, the invention will be more fully explained. In FIGURE 1 there is shown a rocket motor having a case 10 closed at its forward end by means of closure member 11 secured in case 10 by means of key 12. O-ring 13 provides a seal between case 10 and closure member 11. A rounded nose portion 14 is secured to said closure member 11 by means of bolt 16 threaded into cross member 17. A nozzle 18, described in further detail in connection with FIGURE 3 below, is disposed in the after end of said case 10. Casing 10 defines in part a combustion chamber having a propellant charge made up of a plurality of arcuate shaped propellant grains 19 and a plurality of generally rectangular shaped propellant grains 21 disposed around the inner wall of said case 10. Said rectangular shaped grains are disposed between and adjoin said arcuate shaped grains. All of said grains are disposed with one side thereof adjacent the inner wall of case 10. It will be noted that said grains adjoin each other on inwardly extending sides. A recess 22 is provided in each of the inwardly extending sides of said arcuate shaped grains adjacent the side 23 thereof which is adjacent the inner wall 20 of said case 10. A recess 24 is provided in each of the inwardly extending sides of said rectangular shaped grains 21 adjacent the side 26 thereof which is adjacent the inner wall 20 of said case 10. Said recesses 22 and 24 thus form opposing recesses in the adjoining sides of said arcuate shaped grains 19 and said rectangular shaped grains 21. The non-adjoining surfaces 27 and 27', respectively, of said grains define a coaxially disposed passage through the combustion chamber. Said adjacent side 23 and said recesses 22 of arcuate grains 19 are covered with a rigid sheath of essentially non-combustible material. Likewise, said adjacent side 26 and said recesses 24 of rectangular shaped grains 21 are also covered with a rigid sheath of non-combustible material. As shown more clearly in FIGURES 9 and 10, the adjoining sides of arcuate shaped grains 19 and rectangular shaped grains 21, like the grains of FIGURES 9 and 10, are coated with a restrictor material on their adjoining surfaces. Said restrictor material extends over the junction between said sheath of non-combustible material and the grain. This is a safety feature to prevent entry of hot combustion gases behind said sheath of non-combustible material which could cause burning behind said sheath with resultant loss of strength.

A plurality of engaging members 28 are attached at spaced intervals around the inner wall 20 of said case 10. As here shown, each of said engaging members comprises a T-shaped bar member which is attached along the base of the vertical leg of said T to the inner wall of said case 10. Said engaging member 28 is shown more clearly in FIGURE 11. The horizontal or cross member of said T-shaped bar coacts with the sheathed portion of said propellant grains, in this instance at opposing recesses 22 and 24, and serves to hold said propellant grains adjacent said inner wall 20 of said case 10. Said engaging members 28 extend longitudinally through the combustion chamber.

An obturator 25, preferably of a resilient material, and preferably adhesively attached to said engaging means, can be provided to further prevent the entrance of hot combustion gases behind the sheathed grains, thus protecting said sheath and the wall of the case. The relation between the obturator 25 and the remainder of the assembly is more clearly shown in FIGURE 4.

A ring member 29 having an opening 31 therein is provided in the after end of case 10. Said ring member provides a support for propellant grains 19 and 21.

Referring now to FIGURE 2, the means for closing the forward end of a combustion chamber is illustrated. There is provided a closure plate 32 having an opening 33 therein. Said closure plate 32 fits within the inner wall 20 of case 10 and is provided with indentations 34 which are adapted to receive engaging members 28 as shown. Springs 36 mounted on and around bars 37 bear against closure member 11 and thus hold the entire assembly in compact arrangement between plate 32 and ring 29 when said closure member 11 is inserted in the forward end of case 10.

Referring now to FIGURE 3, there is illustrated in detail one form of igniter which can be employed in the rocket motor of the invention. Nozzle 18 is provided with an axial venturi passage 38 defined by the inner walls of nozzle 18. As employed herein and in the claims, the term "throat" designates that portion of the nozzle passage 38 having the smallest cross sectional area. The inner end of the nozzle is provided with a threaded shoulder 42. A perforate member 43 is secured to the inlet end of the nozzle by annular cap 44 which is threaded to shoulder 42. Said perforate member can be made of a plastic or rubber coated wire mesh, or other suitable material, which will soften or rupture upon being subjected to heat. A starter disk 46 (which can be made of Inconel, copper, aluminum, etc.) and designed to burst, for example, at some specified pressure within the range of 500 to 1000 p.s.i. is disposed in the diverging portion of nozzle passage 38 and extends completely across said passage 38. The periphery of said starter disk is provided with a flange 47. The after portion of nozzle 18 is preferably a separate portion 48 in the form of a lock ring which is threadedly connected to the after threaded shoulder 49. After nozzle section 48 is provided with an annular groove 51 to receive the flanged periphery 47 of disk 46.

Adjacent the inner face of starter disk 46 is a resilient damper member 52 which is made of rubber, or the like, and which is preferably cemented to the inner face of said starter disk and to the adjacent inner walls of passage 38. The cavity or space defined by the inner faces of perforate member 43, damper member 52, and the inner walls of the nozzle passage therebetween is filled with ignition material 53, preferably in the form of discrete particles or pellets. The central nozzle section 54 is provided with lateral passages 56 in which there are disposed suitable fuses, matches, or squibs 57 which are held in said passageways 56 by insulated connectors 58 which can be made of plastic and which, after insertion of said fuses, are screwed into place.

Squibs 57 are connected in parallel by wires 59 and 61, one of their ends being attached to an insulated binding box 62 and the other of their ends being attached to a grounded binding box 63. Wire 64 supplies current from an external power source, such as a battery, to wire 66 which in turn supplies current to wires 59 and 61. It is apparent that other electrical responsive means can be employed in place of that illustrated. Further details regarding said igniter 18 can be found in copending application Serial No. 632,244, filed January 2, 1957, where said igniter is disclosed and claimed.

In operation of the assembled rocket motor shown in FIGURE 1 upon the closing of a suitable switch, electric current flows to the fuses 57 which function in a well known manner to ignite the igniter material 53. Hot gases resulting from the burning of igniter material 53 enter the combustion chamber of the rocket motor, establish desired working pressure therein and thereby initiate combustion of propellant grains 19 and 21 upon their exposed surfaces 27 and 27'. The propellant grains in burning form hot combustion gases which, after being momentarily held back, rupture the rubbery or plastic material covering the perforation which material can be subsequently softened and melted upon being contacted with the hot gases rushing through the perforations. Thereafter, said combustion gases leave the combustion chamber through said nozzle 18 and in doing so develop thrust.

Figure 4:
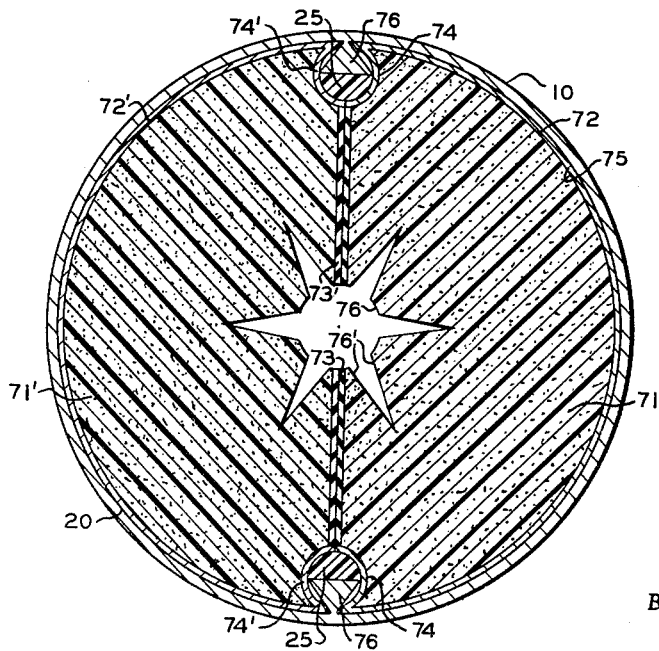
FIGURE 4 is a cross-section of a rocket motor illustrating another propellant charge configuration and another means of suspending the propellant grains according to the invention.

In FIGURE 4 there is illustrated another grain configuration which can be employed in accordance with the invention. In this modification of the invention two semi-cylindrical shaped grains 71 and 71' are employed. One side, 72 and 72', of each of said grains is adjacent the inner wall 20 of case 10 as are the grains described in FIGURE 1. Said grains adjoin each other along sides 73 and 73'. Said adjoining sides 73 and 73' of said grains are covered with a suitable restrictor material on their non-exposed surfaces. Said grains 71 and 72' are provided with recesses 74 and 74' in their adjoining sides 73 and 73' adjacent said adjacent sides 72 and 72'. The exposed surfaces 76 and 76' of said grains form a coaxially disposed passage through the combustion chamber in the same manner as the propellant grains of FIGURE 1. Said adjacent sides 72 and 72' and said recesses 74 and 74' are covered with a rigid sheath of essentially non-combustible material 75 (here shown to be a metal) in the same manner as were the adjacent sides and recesses of the grains described in connection with FIGURE 1.

FIGURE 4 also illustrates another modification of the engaging means which can be employed to hold the propellant grains adjacent the inner wall 20 of case 10. The engaging means of FIGURE 4 comprises a triangular shaped bar 76 attached along one edge or apex to the inner wall of said case 10. Obturator 25 is similar in shape and of a resilient material like that of FIGURE 1.

Figure 6:
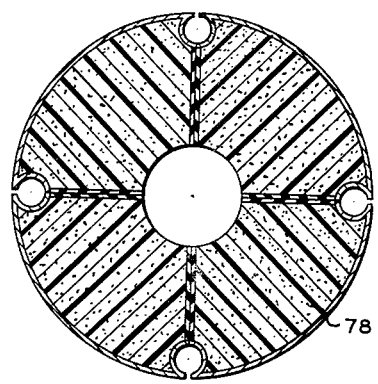

In FIGURES 5 and 6 there are illustrated two other grain configurations which can be employed in the practice of the invention. In each instance, said grains are wedge shaped. In FIGURE 5 the grains 77 are three in number whereas in FIGURE 6 four grains 78 are employed. Said grains are restricted along their adjoining sides as in FIGURES 1 and 4. The exposed non-adjoining surfaces of said grains also form a coaxially disposed passage through the combustion chamber as in FIGURES 1 and 4. For simplicity, only the assembly of the propellant grains are shown in FIGURES 5 and 6, i.e., case 10 has been omitted.

Figure 7:
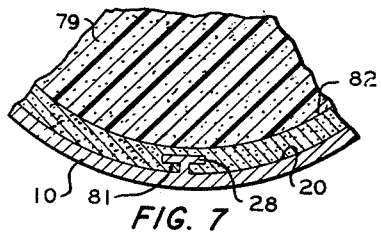
FIGURES 7 and 8 illustrate still other engaging means for holding the propellant grains in a rocket motor in accordance with the invention.
Figure 8:
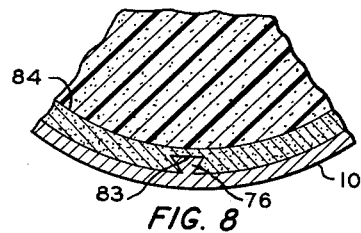

FIGURES 7 and 8 illustrate two other modifications of the engaging means which is employed to hold the propellant grains adjacent the inner wall 20 of case 10. In FIGURE 7, the propellant grain 79 does not have recesses in the adjoining sides adjacent the side of the grain which is adjacent the inner wall 20 of case 10. Instead, a T-shaped recess 81 is formed in sheath 82 at about the mid-point of the grain. Said T-shaped recess coacts with a T-shaped bar 28 like that illustrated in FIGURE 1 which is attached along the base of the vertical leg of said T to the inner wall 20 of case 10.

In FIGURE 8, a triangular shaped bar 76 like that in FIGURE 4 is employed as engaging means. Said bar 76 coacts with a triangular shaped recess 83 which is formed at about the mid-point of the rigid sheath 84.

FIGURES 9 and 10 illustrate a grain configuration which can be employed in still another modification of the invention. It will be observed that these grains are similar in shape to the grains employed in FIGURE 1 except that they are tapered from one end to the other. Said taper is employed both in the root of the grain, i.e., that portion of the grain where the recesses are formed, and also in the body of the grain. When tapered grains are employed the small ends of the grains are preferably placed adjacent the exhaust or nozzle end of the combustion chamber. A primary purpose of the tapered root of the grains is to off-set the tendency of the grains to move rearwardly in the case toward the nozzle (commonly referred to as "grain setback") when the rocket motor is fired. The taper in the body of the grain provides a perforation of increasing cross section to reduce pressure drop during burning of the grain. FIGURES 9 and 10 also illustrate another modification of the invention in that they show the grains 87 and 88 to be restricted along the surface beneath the rigid sheath of non-combustible material.

FIGURE 11 illustrates a tapered obturator 86 which can be employed with the tapered grains of FIGURES 9 and 10. As shown, said obturator 86 is attached to T-shaped engaging bar 28, but it can also be employed with the triangular shaped engaging bar 76 of FIGURES 4 and 8. Said obturator is of a resilient material and is preferably cemented to the engaging bar.

From the above description of the invention it will be apparent to those skilled in the art that the invention possesses distinct advantages over the rocket motors of the prior art. A very important advantage of the present rocket motor lies in the fact that every part of the rocket charge can be examined for flaws such as cracks or fragmentation immediately before the propellant charge is installed in the case of the rocket motor. Employing this method, one can fabricate in advance any number of propellant grains which can be stock-piled and then assembled into a propellant charge immediately before it is desired to fire the rocket. Another important advantage of the rocket motor of the invention is that the primary advantage of "case bonding" i.e., high propellant to total rocket weight ratio has been realized without the usual disadvantages, i.e., tendency of the grain to pull away from the case.

Obviously, any suitable propellant material can be employed in the rocket motor of the invention. Examples of suitable propellants are the rubbery base propellants. Such solid propellants comprise a binder or fuel component as the continuous phase having a solid oxidant component, together with or without a suitable burning rate catalyst, dispersed in said binder component. A presently preferred class of solid propellants comprises a solid oxidant, such as ammonium nitrate or ammonium perchlorate, dispersed in a rubbery material, such as a copolymer of a conjugated diene and a vinylpyridine or other substituted heterocyclic nitrogen base compounds. These propellants are produced by mixing the oxidant and copolymer together with suitable curing or quaternizing agents, and with or without an appropriate burning rate catalyst. The resulting mixture is then cast, compression molded, or extruded, and then cured to form the solid propellant grain. When employing the tapered grains referred to above the grain can be machined to provide the desired taper. Solid rocket fuel compositions of this type and a process for their production are disclosed and claimed in copending application Serial No. 284,447, filed April 25, 1952, by W. B. Reynolds et al., now Patent No. 3,003,861.

Double base propellant compositions such as nitrocellulose plus a nitrate ester such as nitroglycerine, to which has been added the necessary plasticizers etc., can also be employed in the rocket motor of the invention.

Castable propellant compositions can also be employed in the rocket motor of the invention. An example of a suitable binder composition in this type propellant is a polyurethane comprised of a polypropylene glycol (molecular weight about 2000), a triol or quadraol such as castor oil or Quadrol (N,N,N',N'-tetrakis-(2-hydroxypropyl)-ethylenediamine), and tolylene diisocyanate.

A preferred propellant composition is prepared by combining from about 70 to 90 parts by weight of ammonium nitrate, as the solid oxidant, with 10 to 30 parts by weight of a preferred binder and burning rate catalyst. The burning rate catalyst will usually comprise 0 to 10 parts by weight of the entire composition. Said preferred binder is a rubber copolymer prepared from a monomer mixture comprising about 25 to 98 parts by weight of butadiene and about 2 to 72 parts by weight of 2-methyl-5-vinylpyridine. Preferred propellant compositions are disclosed and claimed in copending application Serial No. 561,943, filed January 27, 1956, by W. B. Reynolds et al. A particularly preferred propellant composition comprises 65 to 90 parts by weight of ammonium perchlorate in 35 to 10 parts by weight of binder.

Suitable binder materials also include copolymers of butadiene and styrene, copolymers of butadiene and vinylpyridine, copolymers of butadiene and vinylquinoline, and the like.

Suitable burning rate catalysts include rouge, ammonium dichromate, Prussian blue, Milori blue, and the like.

The essentially non-combustible sheath which is applied to the back side of the grains, i.e., the side of the grains which is adjacent the inner wall 20 of the case 10 of the rocket motor can be formed from any suitable rigid essentially non-combustible material. One preferred class of such materials includes any suitable metal such as aluminum, titanium, sheet steel, stainless steel, etc. For weight reasons aluminum is usually preferred when a metal is employed.

The rigid essentially non-combustible sheath can also be formed from fiberglass reinforced thermosetting resins such as the phenolic resins, the epoxy resins and the polyester resins. Examples of the phenolic resins include those such as are produced by the chemical reaction of phenol and its derivatives with formaldehyde and its derivatives, and which are sold under the trade name of Bakelite by the Bakelite Division of Union Carbide and Chemical Company. Examples of the epoxy resins include those such as are produced by the reaction of the bis-phenols with epichlorohydrin and which are sold under the trade name of Epons by Shell Chemical Corporation. Examples of the polyester resins which can be employed include those such as are produced by the reaction of a dibasic acid such as maleic acid, fumaric acid, and phthalic acid with a dihydric alcohol such as ethylene glycol or propylene glycol dissolved in a polymerizable monomer such as styrene or methyl methacrylate. Examples of these polyester resins are the Plaskon polyester resins sold by the Barrett Division of Allied Chemical and Dye Corporation. As will be understood by those skilled in the art, these materials can be purchased in liquid form and applied as liquids after being mixed with a suitable catalyst, which catalyst causes them to harden upon application of heat into a hard, rigid, thermosetting resin. The fiberglass reinforcing material can be mixed with said resin while it is liquid and the mixture molded to the desired shape and cured. Or, if desired successive layers of fiberglass can be placed in the mold and impregnated with the liquid resin to build up a material of desired thickness which can then be cured.

Examples of resilient materials which can be employed for the obturator include: Kel-F, which is polytrifluorochlorethylene and which is sold by Minnesota Mining and Manufacturing Company; and Vito-A, which is a copolymer of vinylidine fluoride and hexafluoropropylene and is sold by E. I. du Pont de Nemours and Co. A preferred material for the obturator is rubber. Natural rubber and synthetic rubbers such as copolymers of butadiene and styrene, or the like, are suitable.

While the invention has been illustrated as employing propellant grains having certain configurations, it will be understood by those skilled in the art that grains of any configuration can be employed to give a propellant charge having an inner exposed surface of any type to give a desired type of burning rate curve. Likewise, the plurality of propellant grains employed can comprise any convenient number depending upon the size of the rocket motor and the type of burning rate curve desired. For example, in the smaller rocket motors probably only a few propellant grains such as 2, 3, or 4, as illustrated in FIGURES 4, 5, and 6, would be employed whereas in the larger rocket motors a larger number of propellant grains such as in FIGURE 1 would be employed. It is believed obvious that instead of using grains to obtain a "four-pointed star" as in FIGURE 1 an odd number of arcuate shaped grains and rectangular shaped grains could be employed to give a three, five, seven, or other number pointed star in a rocket motor, similar to that illustrated in FIGURE 1.

The restrictor material applied to the propellant grains of the invention can be any of the slow burning materials used for this purpose in the rocket art, such as cellulose acetate, ethyl cellulose, butadiene-methylvinylpyridine copolymer, GR–S, and the like. Said restrictor material can be self-bonded, solvent bonded, or adhesively bonded to the propellant grains with any suitable adhesive such as Thiokol Bonding Agent sold by the Thiokol Corporation, 7711 Rubber Cement sold by Van Cleef Bros. Inc., and Van Cleef's Rubber Bonding Cement. Any suitable adhesive, including those just named, can be used to bond the restricted grains or the non-restricted grains to the sheathing material.

Various other modifications of the invention can be made or followed by those skilled in the art in view of the above disclosure. Such modificatoins are believed to be within the spirit and scope of the invention.

I claim:

1. A rocket motor comprising: a case defining a combustion chamber, said case being closed at its forward end and having nozzle means for exhausting combustion gases disposed in its after end; a plurality of propellant grains disposed around the inner wall of said case with one side thereof adjacent said inner wall; said grains adjoining each other along a portion of at least one other side of each; a rigid sheath of essentially non-combustible material covering said side of each said grain which is adjacent said inner wall; and a plurality of bar members, each attached at one edge thereof to and extending longitudinally along said inner wall of said case and each having at least two surfaces thereof adapted to coact with the sheathed portion of said grains so as to hold said grains adjacent said inner wall.

2. A rocket motor comprising: a case defining a combustion chamber, said case being closed at its forward end; a nozzle defining a Venturi-like passage disposed in the after end of said case; a plurality propellant grains disposed around the inner wall of said case with one side thereof adjacent said inner wall; said grains adjoining each other along a portion of at least one other side of each and the exposed non-adjoining surfaces of said grains defining a coaxially disposed passage through said combustion chamber; a rigid sheath of essentially non-combustible material covering said side of each said grain which is adjacent said inner wall; and a plurality of bar members, each attached at one edge thereof to and extending longitudinally along said inner wall of said case and each having at least two surfaces thereof adapted to coact with the sheathed portion of said grains so as to hold said grains adjacent said inner wall.

3. A rocket motor according to claim 2 wherein said bar member is T-shaped and is attached to said inner wall along the base of the vertical leg of said T.

4. A rocket motor according to claim 2 wherein said bar member is triangular in shape and is attached to said inner wall along one apex.

5. A rocket motor according to claim 2 wherein said propellant grains: are two in number; are generally semi-circular in shape; and adjoin each other along one side.

6. A rocket motor according to claim 2 wherein said propellant grains: are more than two in number; are generally wedge shaped; and adjoin each other along two sides.

7. A rocket motor according to claim 2 wherein a recess is provided in said sheath at about the mid-point of said adjacent side of said grains and said recess is adapted to coact with and engage one of said bar members.

8. A rocket motor comprising: a case defining a combustion chamber, said case being closed at its forward end; a nozzle defining a Venturi-like passage for exhausting combustion gases disposed in the after end of said case; a plurality of propellant grains disposed around the inner wall of said case with one side thereof adjacent said inner wall; said grains adjoining each other along a portion of at least one other side of each and the exposed non-adjoining surfaces of said grains defining a coaxially disposed passage through said combustion chamber; each of said grains having opposing recesses in said adjoining sides adjacent said side thereof which is adjacent said inner wall; a rigid sheath of essentially non-combustible material covering said adjacent side and the surfaces of said recesses in each grain; and a plurality of bar members, each attached at one edge thereof to and extending longitudinally along said inner wall of said case and each having at least two surfaces thereof adapted to coact with said recesses in said grains so as to hold said grains adjacent said inner wall of said case.

9. A rocket motor according to claim 8 wherein said bar member is T-shaped and is attached to said inner wall along the base of the vertical leg of said T.

10. A rocket motor according to claim 8 wherein said bar member is triangular in shape and is attached to said inner wall along one apex.

11. A rocket motor comprising: a case defining a combustion chamber, said case being closed at its forward end; a nozzle defining a Venturi-like passage for exhausting combustion gases disposed in the after end of said case; a plurality of arcuate shaped propellant grains disposed around and with one side thereof adjacent the inner wall of said case; a plurality of generally rectangular shaped propellant grains disposed around said inner wall of said case between and adjoining said arcuate shaped grains and with one side thereof also adjacent said inner wall of said case, said rectangular shaped grains extending along a transverse axis thereof toward the longitudinal axis of said combustion chamber; the non-adjoining surfaces of all of said grains defining a coaxially disposed passage through said combustion chamber; each of said grains having opposing recesses in said adjoining sides thereof adjacent the side thereof which is adjacent said inner wall; a rigid sheath of essentially non-combustible material covering said adjacent side and the surface of said recess in each grain; and a plurality of engaging means, attached to and extending longitudinally along said inner wall of said case, and adapted to coact with said recesses in said grains so as to hold said grains adjacent said inner wall of said case.

References Cited in the file of this patent

UNITED STATES PATENTS

| | | |
|---|---|---|
| 1,440,175 | Riabouchinski | Dec. 26, 1922 |
| 2,479,828 | Geckler | Aug. 23, 1949 |
| 2,484,355 | Parsons | Oct. 11, 1949 |
| 2,816,418 | Loedding | Dec. 17, 1957 |

OTHER REFERENCES

"Fiberglas Reinforced Plastic as a Rocket Structural Material," Jet Propulsion, vol. 26, No. 11, November 1956, pp. 969–972, published by the American Rocket Society.